US008708222B2

(12) United States Patent
Huber et al.

(10) Patent No.: US 8,708,222 B2
(45) Date of Patent: Apr. 29, 2014

(54) METHOD FOR PRODUCING A FINISHING LAYER CONTAINING A WINDOW FOR A PORTABLE DATA STORAGE MEDIUM AND SAID FINISHING LAYER

(75) Inventors: Peter Huber, Furstenfeldbruck (DE); Klaus Kohl, Miesbach (DE); Fabik Roman, Klasov (SK); Christina Schellenberger, Garching (DE); Manuela Schropf, Munich (DE)

(73) Assignee: Giesecke & Devirent GmbH, Munich (DE)

(*) Notice: Subject to any disclaimer, the term of this patent is extended or adjusted under 35 U.S.C. 154(b) by 18 days.

(21) Appl. No.: 13/201,483

(22) PCT Filed: Feb. 12, 2010

(86) PCT No.: PCT/EP2010/051806
§ 371 (c)(1),
(2), (4) Date: Aug. 15, 2011

(87) PCT Pub. No.: WO2010/094633
PCT Pub. Date: Aug. 26, 2010

(65) Prior Publication Data
US 2011/0297750 A1 Dec. 8, 2011

(30) Foreign Application Priority Data

Feb. 17, 2009 (DE) .................. 10 2009 009 263

(51) Int. Cl.
*G06F 17/00* (2006.01)
*G06K 19/00* (2006.01)
*G06K 19/06* (2006.01)
*H01L 23/02* (2006.01)

(52) U.S. Cl.
USPC ........... 235/375; 235/487; 235/492; 235/493; 257/679; 257/680; 257/686; 257/678

(58) Field of Classification Search
USPC .......... 235/487, 492, 493, 375; 257/678, 679, 257/680, 686
See application file for complete search history.

(56) References Cited

U.S. PATENT DOCUMENTS 4,401,721 A * 8/1983 Hida .............................. 503/200
4,531,765 A * 7/1985 Shulman ...................... 283/114
(Continued)

FOREIGN PATENT DOCUMENTS

CN 101315676 A 12/2008
CN 101535870 A 9/2009
(Continued)

OTHER PUBLICATIONS

Wikipedia: Offsetdruck. Jan. 30, 2009 [recherchiert am Dec. 27, 2011]. Im Internet: <http://de.wikipedia.org/w/index.php?title=Offsetdruck&oldid=56037995> with English translation.

(Continued)

*Primary Examiner* — Daniel Walsh
(74) *Attorney, Agent, or Firm* — Workman Nydegger (57) ABSTRACT

A method for producing a finishing layer containing a window (104) for a portable data storage medium, in particular a chip card, and the use of the method for producing a data storage medium. A transparent plastic-based support layer (28) is used and an opaque color layer (30) is applied on the support layer in a screen printing process, wherein the color layer (30) has a recess (32) having the dimensions of the window (104). A first layer (40) of a transparent primer is then screen printed onto the color layer and a design color layer (50) is then applied in an offset printing process onto the first layer. A second layer (60) of a transparent primer is applied in an offset printing process on top of the design color layer (50) and a transparent finish (70) is finally applied onto the second layer (60).

12 Claims, 4 Drawing Sheets

(56) References Cited

U.S. PATENT DOCUMENTS

| | | | | |
|---|---|---|---|---|
| 4,754,319 A * | 6/1988 | Saito et al. | 257/679 |
| 4,792,843 A * | 12/1988 | Haghiri-Tehrani et al. | 257/679 |
| 4,797,542 A * | 1/1989 | Hara | 235/380 |
| 4,876,441 A * | 10/1989 | Hara et al. | 235/488 |
| 5,026,452 A * | 6/1991 | Kodai | 156/293 |
| 5,679,440 A * | 10/1997 | Kubota | 428/195.1 |
| 6,293,470 B1 * | 9/2001 | Asplund | 235/487 |
| 6,644,552 B1 * | 11/2003 | Herslow | 235/488 |
| 7,377,446 B2 * | 5/2008 | Ohta et al. | 235/492 |
| 7,893,005 B2 * | 2/2011 | Funada et al. | 503/227 |
| 8,208,262 B2 * | 6/2012 | Sakurai et al. | 361/737 |
| 2001/0010851 A1 * | 8/2001 | Kita et al. | 428/64.1 |
| 2001/0018984 A1 * | 9/2001 | Takeda et al. | 174/256 |
| 2003/0178495 A1 * | 9/2003 | Jones et al. | 235/492 |
| 2004/0043203 A1 * | 3/2004 | Bogdanovic | 428/201 |
| 2004/0045931 A1 * | 3/2004 | Hill et al. | 216/54 |
| 2004/0129450 A1 * | 7/2004 | Yamazaki et al. | 174/250 |
| 2004/0169086 A1 * | 9/2004 | Ohta et al. | 235/492 |
| 2004/0257973 A1 * | 12/2004 | Berneth et al. | 369/275.5 |
| 2005/0019989 A1 * | 1/2005 | Droz | 438/127 |
| 2005/0194454 A1 * | 9/2005 | Ferber et al. | 235/492 |
| 2006/0196948 A1 * | 9/2006 | Weber et al. | 235/487 |
| 2006/0227523 A1 * | 10/2006 | Pennaz et al. | 361/783 |
| 2006/0249951 A1 * | 11/2006 | Cruikshank et al. | 283/92 |
| 2007/0013983 A1 * | 1/2007 | Kitamura et al. | 359/3 |
| 2007/0176273 A1 * | 8/2007 | Wolny | 257/679 |
| 2008/0043584 A1 * | 2/2008 | Kawano et al. | 369/47.5 |
| 2008/0067247 A1 * | 3/2008 | McGregor et al. | 235/439 |
| 2008/0080352 A1 * | 4/2008 | Kitaura et al. | 369/100 |
| 2008/0245865 A1 * | 10/2008 | Mosteller | 235/449 |
| 2008/0251581 A1 * | 10/2008 | Faenza | 235/435 |
| 2008/0299860 A1 | 12/2008 | Lee et al. | |
| 2009/0169776 A1 * | 7/2009 | Herslow | 428/29 |
| 2010/0026943 A1 * | 2/2010 | Jagt et al. | 349/115 |
| 2010/0039594 A1 * | 2/2010 | Golan et al. | 349/122 |
| 2010/0085718 A1 * | 4/2010 | Sakurai et al. | 361/761 |
| 2010/0102132 A1 * | 4/2010 | Droz | 235/492 |
| 2010/0295290 A1 * | 11/2010 | Muth et al. | 283/109 |
| 2011/0084148 A1 * | 4/2011 | Ricketts et al. | 235/492 |
| 2011/0222228 A1 * | 9/2011 | Singleton | 361/679.4 |
| 2012/0049309 A1 * | 3/2012 | Kiyomoto et al. | 257/434 |
| 2013/0126622 A1 * | 5/2013 | Finn | 235/492 |

FOREIGN PATENT DOCUMENTS

| | | |
|---|---|---|
| EP | 1 035 504 A1 | 9/2000 |
| WO | 2008015676 | 2/2008 |
| WO | 2008147061 | 12/2008 |

OTHER PUBLICATIONS

Wikipedia: Siebdruck. Feb. 9, 2009 [recherchiert am Dec. 27, 2011]. Im Internet: <http://de.wikipedia.org/w/index.php?title=Siebdruck&oldid=56460817> with English translation.
International Search Report in PCT/EP2010/051806, Oct. 31, 2011.

* cited by examiner

METHOD FOR PRODUCING A FINISHING LAYER CONTAINING A WINDOW FOR A PORTABLE DATA STORAGE MEDIUM AND SAID FINISHING LAYER

BACKGROUND OF THE INVENTION

1. Field of the Invention

The invention relates to a method for producing a finishing layer containing a window, allowing a display element disposed beneath the finishing layer to be observed when used in a portable data storage medium. The invention further relates to a portable data storage medium having an active display element and a method for the production thereof. The invention particularly relates to a chip card having a display.

2. Related Art

Chip cards having displays and methods for the production thereof are known in great numbers. For example, a production method can be taken from WO 2008/147061 A1, according to which a board having electronic components, namely: the display, the IC with a contact pad, a battery, and a push-button including required wiring, is placed in a frame and potted with synthetic resin, so that a planar structure is created, the top side of which comprises the display. The synthetic resin is cured and the surfaces are smoothed out. The top and bottom side of the structure thus produced is then finished off by means of a printed cover layer, wherein the top cover layer comprises cutouts leaving the display and the contact pad exposed. Alternatively, the top and bottom sides or only the top side can be finished off entirely by means of a transparent cover layer. The cover layers are bonded to the intermediate structure by the application of high temperature. The known method produces usable cards, but the surface comprising the display comprises a palpable edge all around the display, arising due to the cutout in the cover film. When using a transparent cover layer, on the other hand, it is generally required that alphanumeric information be applied directly to the intermediate structure comprising the display element and the additional components. Obtaining good optical quality is thereby very challenging from the production engineering aspect.

The fundamentals of the function, construction, and production of chip cards are known from the "Handbook of Chip Cards" by W. Rankl, W. Effing, Carl Hanser Verlag Munich, 5th edition, 2008. A chip card having a display can also be found in the book. On the subjects of card materials, installation and construction of components for chip cards, and laminating, which are relevant to implementing the invention, explicit reference is made to the book.

A fundamental problem in the production of chip cards with displays, particularly corresponding to the requirements of the relevant ISO standard 7810, is complying with the maximum allowable thickness. Display elements and the flat/planar batteries that are often associated therewith generally have installation heights that approach the maximum values for card thickness, according to the ISO standards indicated. It therefore often necessary, when producing chip cards with displays, to ensure that the thickness of the card construction above and below the display element is as small as possible. Despite the low installation height available, the display elements are sensitive to pressure and bending, and must be sufficiently protected against pressure and bending loads. The design of the finishing layer located above the display is therefore often most difficult to design.

The object of the invention is to disclose a finishing layer and a method for the production thereof, making the production of a portable data storage medium having an active display element easier, while maintaining sufficient mechanical protection of the display element.

SUMMARY OF THE INVENTION

The invention is based on the approach of producing a finishing film primarily by means of printing technology. Said approach is based on the idea that it is possible, by properly combining suitable printing materials, to prevent blockages between semi-finished goods, although printing materials at least partially comprising solvents must be used.

According to the invention, a comparably thick cover layer of water-based paint is first applied to a support layer, whereby a base structure arises that is free of solvents, and very thick relative to the subsequent layers, on which at least thin layers of materials comprising solvents can then also be applied without causing blockages. Because blockages are largely prevented, the method according to the invention provides the advantage that it can be implemented in individual processing steps. The embodiment of the entire method can thus be optimized well by means of production engineering. It is particularly suitable for producing data storage mediums in the form of chip cards having outer dimensions according to an ISO standard. The method is characterized in that it allows construction of a very thin finishing layer over the display surface of the active display element, making it possible to maintain the maximum thickness values prescribed by the ISO standards, and nevertheless ensure sufficient mechanical protection of the active display element. Total thicknesses of the finishing layer according to the invention of 60 µm and less can thus be achieved, while a printed film according to the state of the art typically has a thickness of at least 100 µm alone, in order to allow printing. In a particularly advantageous embodiment, the paint layers are each applied at a thickness of 10 to 30 µm in the dry state. The first buffer layer is applied at a thickness of 10 to 30 µm in the dry state, the second buffer layer advantageously at a thickness of 2 to 6 µm in the dry state. The finishing layer produced according to the invention has the further advantage that it provides a completely smooth surface, particularly comprising no noticeable interruptions due to bumps or edges, even over the display element. A further advantage of a finishing layer produced according to the method according to the invention is that said layer can be furnished with optical information of a high quality without particularly great effort. A data storage medium according to the invention is characterized by a clearly bordered display element.

DESCRIPTION OF THE DRAWINGS

An embodiment of the invention is described below in greater detail with reference to the drawing. Shown are.

DETAILED DESCRIPTION OF PREFERRED EMBODIMENTS OF THE INVENTION

Figure 1:
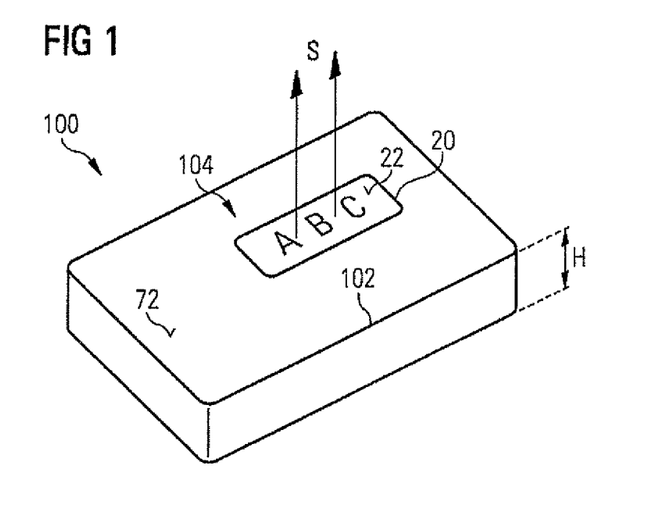
FIG. 1 a perspective view of a portable data storage medium according to the invention, FIG. 2 a schematic representation of the layer construction of a data storage medium according to the invention, in cross section, FIG. 3, 4 variants of the layer construction shown in FIG. 2, and FIG. 5 an illustration of performing the step of applying the finish in a painting system.

FIG. 1 shows a schematic perspective oblique view of a portable data storage medium 100 according to the invention, having an active display element 20 visible through a window 104 formed in the surface 72 of the data storage medium 100 from a viewing side S indicated by arrows. The portable data storage medium 100 comprises, as described below, a plurality of layers connected to each other in the form of a layer stack, wherein at least the surface 72 is flat and the two surfaces 72, 82 are typically, but not necessarily, substantially plane-parallel to each other. The portable data storage medium 100 typically has the form of a chip card having outer dimensions prescribed by relevant standards, primarily the ISO standard 7810; when implemented as a chip card according to ISO 7810, as indicated in FIG. 1, the portable data storage medium 100 has a height, for example, of no greater than 768 µm. The portable data storage medium 100 can, however, also have different outer dimensions, for example it can be round or heart-shaped; the plane-parallel relationship of the surfaces 72 and 82 is also not mandatory. The height H can also, in fact, vary over the area of the portable data storage medium 100, and can form a crest on the opposite surface, for example.

The active display element 20 allows alphanumeric characters to be visibly displayed on the display surface 22 thereof, at least particular characters. It can be of any arbitrary design that allows the active display element 20 to be integrated in the card body of the portable data storage medium 100. The active display element is typically implemented as an LED or TFT display. In the future, however, other embodiments are also expected, particularly using displays of the "electronic paper" type. The active display element 20, hereafter referred to as the display, is located in the interior of the card body of the portable data storage medium 100, beneath the surface 72, and is visible from the viewing side S through the top finishing layer 90. Further electronic and/or mechanical components can also be disposed in the card body, particularly, as is indicated representatively in FIG. 2, an integrated circuit (IC); further typical components are, for example, a battery for supplying energy to the IC and the display, or actuating means for user input. Because the further components are not substantial to the invention, no further explanation is needed here. The display area 22 comprises a surface geometry represented in the following by the length L.

Figure 2:
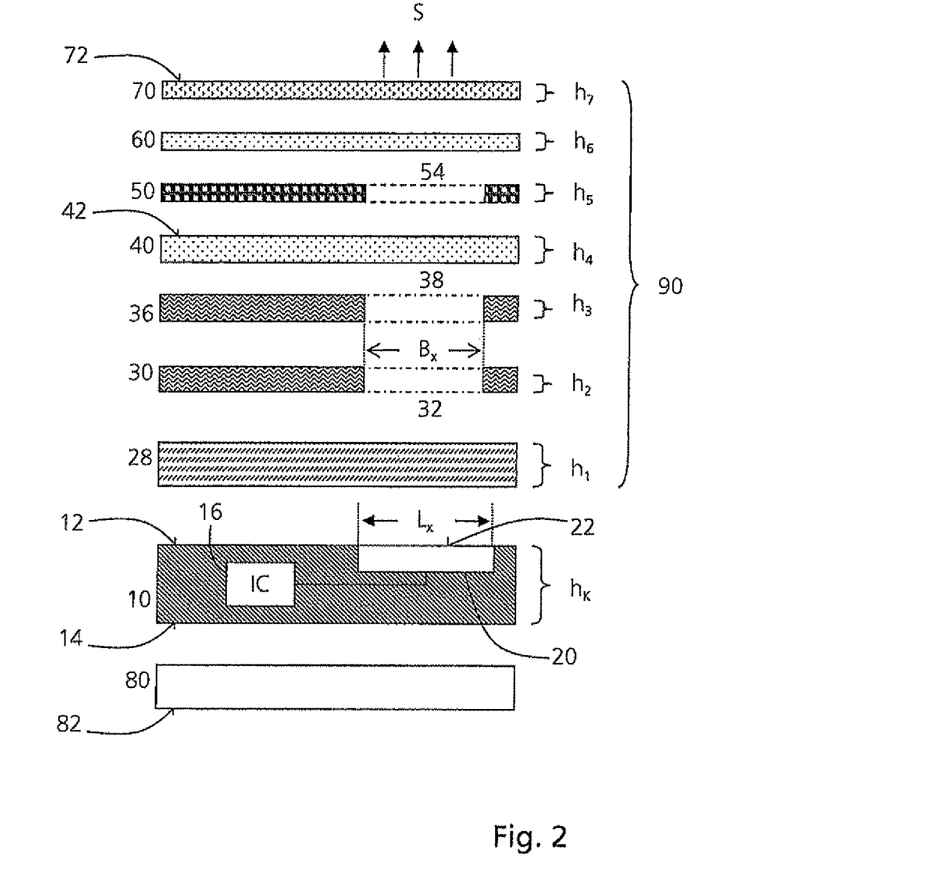

FIG. 2 shows the layer construction of a portable data storage medium, as shown in FIG. 1, in a cross-sectional view. Both the construction of the data storage medium 100 according to the invention and the sequence of a method for the production thereof are explained using FIG. 2. In view of the typical embodiment cited, the portable data storage medium 100 is hereafter referred to as a chip card, without thereby intending to define a particular shape.

The chip card 100 is based on a core layer 10, having a top finishing layer 90 applied to the top side 12 thereof, and a lower finishing layer 80 applied to the bottom side thereof.

All layers 10, 80, 90 are permanently bonded to each other. The production of the outer contour 102 of the chip card 100 can take place in that the layers 10, 80, 90 are first bonded to each other as a sheet, then the outer contour 102 is generated by punching or cutting. On the other side, it is possible to provide the required size of layers 10, 80, 90 even before bonding, and to punch or cut them out of a sheet, for example, prior to bonding. Mixed forms of the two concepts are also possible, in which, for example, the core layer 10 is first brought into the final form having the outer contour 102, and the two finishing layers are cut to size or punched out only after bonding. In the following the layers 10, 80, 90 are understood to always means layers having the outer contour 102 of the finished chip card 100. The process steps described are advantageously performed, to the extent possible, on individual blanks; they can also be performed on the entire sheet.

A display 20 is disposed on the top side 12 of the core layer 10, so that its display area 22 faces the viewing side S. All further components are further advantageously disposed in the core layer 10 of the chip card 100, such as the integrated circuit, batteries, memory, communication elements, etc., indicated in FIG. 1 through 4.

In a simple and inexpensive embodiment, the core layer is made of PVC, but can also be made of polycarbonate, PET, or another suitable plastic. It can be constructed of a plurality of layers bonded to each other, or implemented as a single layer. The core layer 10 has a height hoc of typically 200 to 500 µm.

The bottom finishing layer 80 can be a printed film, but also a composite of a plurality of films, or it can be implemented as a pure printed layer. By implication, it is particularly possible that the bottom finishing layer 80 is implemented in the same manner as the top finishing layer 90. The lower finishing layer 80 is, not however, fundamentally part of the subject matter of the present invention, and is therefore not described in further detail here.

The layer designated in summary as the top finishing layer 90 is constructed of a sequence of a plurality of layers. The basis of the top finishing layer 90 is formed by a transparent support layer 28 covering the entire top surface 12 of the core layer 10, including the top side of the display 20. The support layer 28 is provided as a film. It has a height $h_1$ of 20 to 100 µm and is made of a durable transparent material that is strong, shatterproof, and can be laminated. The support layer 28 is advantageously made of transparent PET (polyethylene terephthalate), for example, particularly of the variant PETG.

A first opaque color layer 30 is applied over the support layer 28, comprising a cutout 32 having a width B. The width B thereby represents all dimensions describing the flat area of the cutout 32, such as a rectangle, a circle, an oval, or a complex geometry. The opaque color layer 30 has a height $h_2$ of 10 to 30 µm in the dry state. It is applied by means of screen printing technology. In order to achieve the application height $h_2$, which is relatively great for screen printing, a coarse screen having a mesh size of 29 to 78 µm and a mesh count of 43 to 165 threads/cm and a thread thickness of 27 to 46 µm is used. The screen thickness is between 43 and 98 µm. The opaque color applied is preferably water-based and thereby has a very low tendency to blocking. It is thus possible to sequentially perform the printing steps in separate, individual process steps, sheet by sheet or from a roll, and to stack the sheets on top of each other after performing each printing step or to roll up the printed roller web again, without interlocking taking place between the semi-finished goods. The applied opaque color can be a commercially available color, such as an opaque white, black, red, etc. The cutout 32 is located directly above the display area 22 of the display 20. The width B is exactly the same, or advantageously slightly smaller in size, as the corresponding length L of the display area 22 of the display 20 so that the edge 34 of the cutout 32 forms the visible edge of the display 20 facing the visible side S.

A second opaque color layer 36 is applied over the first opaque color, layer 30, preferably using the same screen parameters and in the same manner, that is, also using screen printing. Exactly as the first color layer 30, it has a cutout 38 preferably located precisely above the cutout 32 of the first opaque color layer 30. The height $h_3$ of the second opaque color layer 36 is also 10 to 30 µm in the dry state. The total height of the color coatings 30, 36 is thus 20 to 60 µm or 15 to 80% of the thickness of the support layer 28. The color applied is again water-based and advantageously identical to the color used for the color layer 30. By implication, however, a different color than is used for the first color layer 30 can also be used for the second color coating—such as blue, if white was selected for the first color layer 30—or a color having a greater or lesser opacity—such as semi-transparent white, if the first color layer 30 is opaque white. The coarse screen, together with pigments in the color bringing about the opacity, cause the top side of the color layer 36 to be relatively rough. After applying the second color layer 36, the semi-finished goods then present can be stacked together or rolled up again, without causing blockages. In an advantageous embodiment, only a single color layer 30 or 36 can be provided.

A first buffer layer 40 is applied over the second opaque color layer 36 in the following step. The buffer coating 40 serves to prepare for the application of the next coating. It particularly ensures sufficient bonding between the color layer 36 and the design layer 50; it also produces a smoother surface for the design layer. The buffer layer 40 is referred to below, as is typical in the context of printed coatings, as a primer layer 40. As with the two color coatings 30, 36, the primer layer 40 is also applied using screen printing. A coarse screen having the same or at least similar thread density as for the two opaque color coatings 30, 36 can advantageously be used.

The primer layer 40 is transparent and is applied over the entire surface of the underlying core layer 10, wherein the cutout 38 is also covered. As for the opaque color coatings 30, 36, the primer layer 40 is also applied having a thickness $h_4$ of 10 to 30 μm in the dry state, that is, the thickness of the primer layer 40 is approximately 10 to 40% of the thickness of the support layer 28. The transparent material used for the primer layer 40 comprises solvents, wherein it is tuned so that it smooths out height variations of the raw surface of the color layer 36, and the primer layer 40 comprises a very smooth and easily printed surface on the top side 42 thereof, relative to the top side of the color layer 36. The material used for the primer layer 40 is further tuned so that the primer layer 40 ensures a good bond between the color layer 36 and the layer above. The material used for the primer layer 40 is further tuned so that no detrimental blockages occur, despite the solvent content. It is possible in principle to apply the primer layer 40 using offset printing, wherein the height thereof is then correspondingly reduced. Application using offset printing is considered primarily if the subsequently applied design color layer 50 has only a low color transfer having mainly small color layer thicknesses, that is, if the second color layer 36 is only slightly obscured by the design color layer 50.

A design color layer 50 is subsequently applied over the primer layer 40, forming a graphical pattern. The application is effected using offset printing. The height $h_5$ of the design color layer 50, referred to below as the design layer, is 1 to 5 μm dry. The graphical pattern can comprise opaque and transparent portions, or can be fully opaque. In the latter case, the graphical pattern 50 generated by the design, layer comprises a cutout 54 above the display area 22 and optionally other components to be kept exposed, such as switches, the geometry of said cutout being adapted to the geometries of the recesses 38, 32 and to the display area 22 of the display. The graphical pattern can in particular be adapted precisely to the geometry of the cutouts.

A second buffer layer 60 is applied over the entire surface over the design layer 50 in the next step, having the same function as the first primer layer 40, and correspondingly referred to below as the second primer layer 60. The second primer layer 60 is transparent and comprises solvents. In contrast to the first primer layer 40, the second primer layer 60 has as significantly lesser thickness than the first, and the application thereof now uses the less expensive offset printing. It is applied so that the height $h_6$ of the second primer layer 60 is 1 to 5 μm in the dry state. Alternatively, the second primer layer 60 can also be applied using screen printing, wherein it then comprises a greater thickness.

Figure 5:
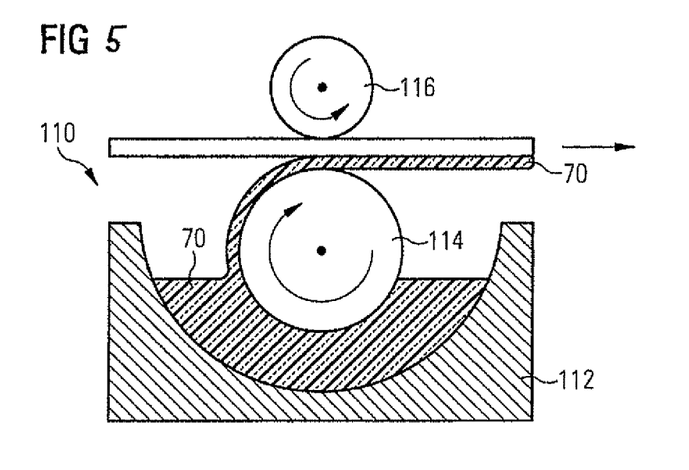

A transparent finish 70 having a height $h_7$ of 2 to 6 μm in the dry state is finally applied over the entire area of the primer layer 60. The finish 70 is applied, as indicated in FIG. 5, in a painting system 110. The finish 70 to be applied is thereby provided in a pan 112 and delivered upward by means of a finish roller 112 against the layer construction made of the layer 28 to 60, which is inverted relative thereto, that is, having the viewing side S facing the finish pan, and deposited at a defined thickness $h_7$ on the second primer layer 60 under counterpressure by a counterpressure roller 116. Applying by means of a painting system 110 ensures that the finish 70 has a uniform thickness $h_7$ over the entire area.

Alternatively to applying by means of a painting system, the finish 70 can in principle be applied by means of a printing line, that is, for example, by means of a printing plate.

After completing the finishing layer 90, the sequence of the transparent layers 28, 40, 60, 70 and cutouts 32, 38 and the cutout 54 form a window 104, through which the display surface 22 of the display 20 is visible from the viewing side S. The edge of the window 104 is preferably defined by the edge 34 of the cutouts 32, 38.

In order to obtain optimized process flows, the steps for implementing the coatings 30, 36, 40, 50, 60 and 70 on a support layer 28 are performed, as a rule, in separate individual process steps, between which the semi-finished goods are each intermediately stacked or intermediately stored on a roll. During the storage period, particularly the latest applied coatings dry out.

In a preferred embodiment, the top finishing layer 90 is produced separately from the core layer 10 and the bottom finishing layer 80. All coatings 10, 80, and 90 are then bonded to each other in a subsequent step, such as by laminating. The procedure has the advantage that the display and the further optionally present components are not loaded by printing process steps. It is also, however, in principle possible to build up the layer shown in FIG. 2 directly on the core layer 10.

The layer construction described above and the method for the production thereof allows a series of variations in the context of the underlying idea. In place of two opaque color coatings 30, 36, three or more or even only one single opaque color layer can be applied; the thicknesses $h_2$, $h_3$ of the color coatings must then be adapted to the number of opaque color coatings actually applied. Similarly, it is possible to apply the primer coatings 40, 60 or the design layer 50 in at least two layers. The same applies for the finish 70.

Under suitable conditions or if required, on the other hand, layers can optionally also be omitted, so that, for example, the primer layer 40 is eliminated, if the top side of the color layer 36 allows the design color layer 50 to be applied directly. The primer layer 60 can also be eliminated if the finish 70 bonds directly to the design color layer 50. To the extent that a suitable material is available, the primer layer 60 can also replace the finish 70 or the second primer layer 60 and the finish 70 can be implemented as a combined coating.

Figure 3:
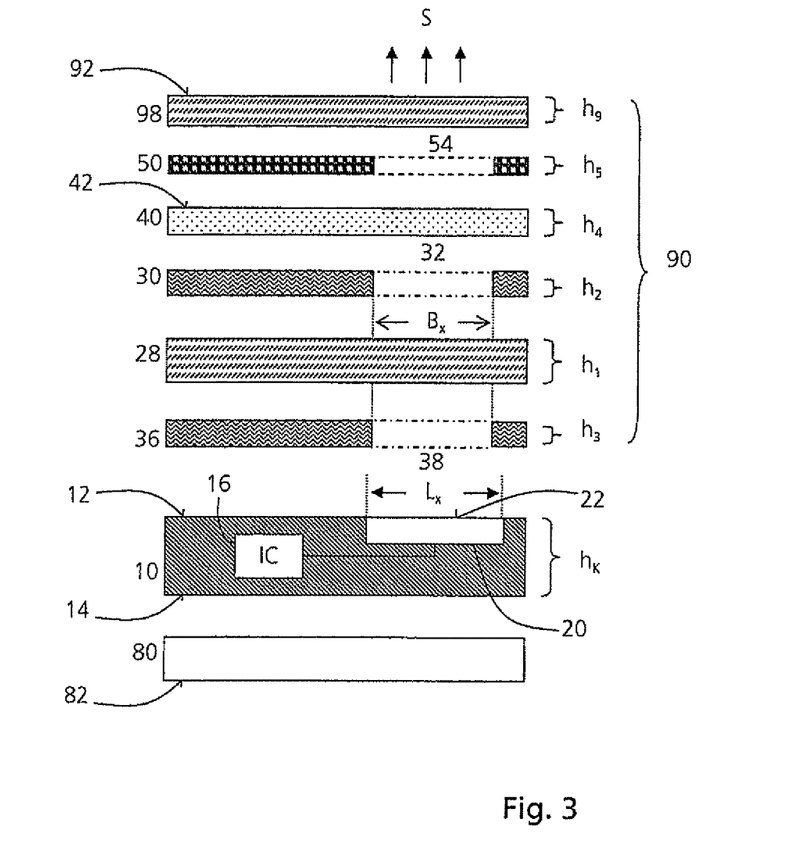

In an alternative embodiment to FIG. 2, shown in FIG. 3, a preferably transparent protective film 98 is applied in place of the layer pair of the primer layer 60 and the finish 70. The protective film 98 can be applied by laminating, advantageously in the course of the laminating step to be performed in any case for bonding the layers 10, 80, and 90. To the extent that the protective film 98 does not bond sufficiently to the design color layer 50, the second primer layer 60 can be retained. Suitable films typically have thicknesses $h_9$ between 20 and 50 µm, but are also available having a thickness of 10 µm. They can be made of PUG, PC, or PVC, for example.

In further embodiment variants from FIG. 2, the coatings can be applied in a partially modified sequence. In an embodiment variant shown in FIG. 3 as well, a layer sequence 30, 40, 50 is applied to the support layer 28 as shown in FIG. 2, however, in contrast to FIG. 2, only one color layer 30 is provided. A further color layer 36 is not applied to the first color layer 30 in said variant, but to the bottom side of the support layer 28 facing the core layer 10, so that the two color layer 30, 36 are on top of each other with the support layer 28 in between. Application and composition of the further color layer 36 are as described in FIG. 2.

Figure 4:
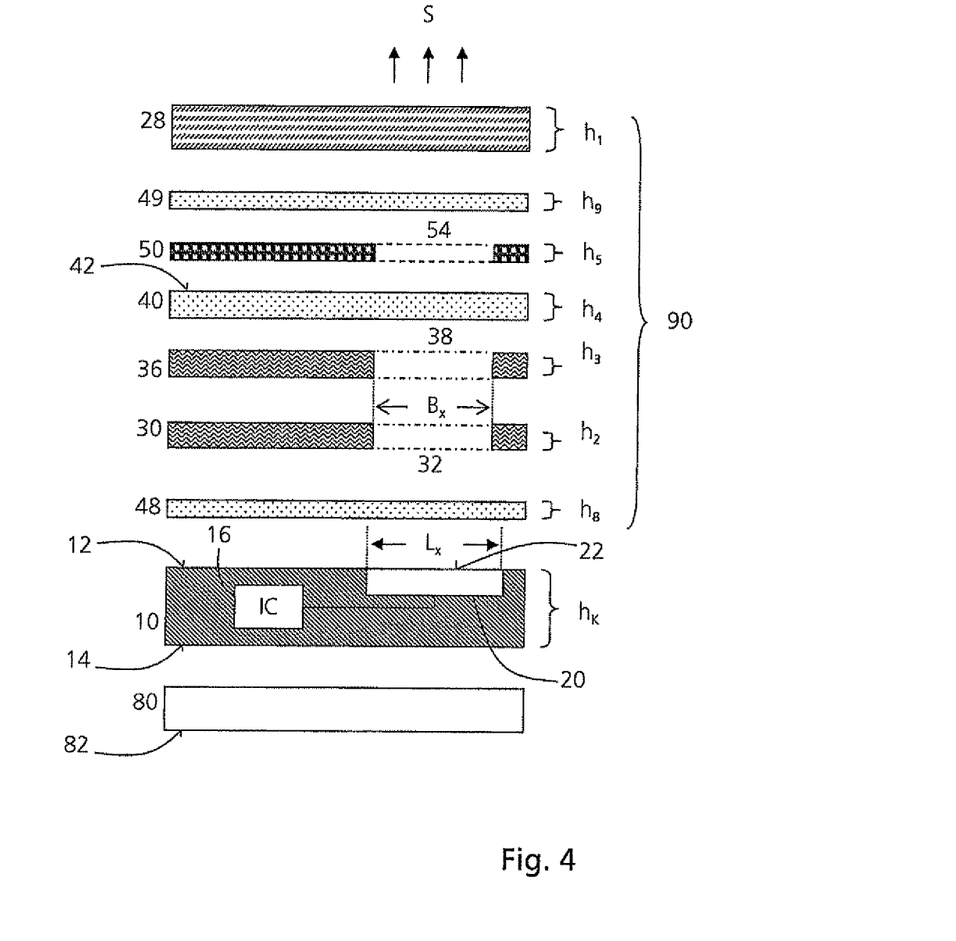

In a further embodiment variant shown in FIG. 4 as an alternative to FIG. 2, the support layer 28 is not located in the interior of the entire construction; rather, the top side thereof forms the outer surface of the finishing layer 90 and the printed coatings 30, 36, 40, 50 are applied to the support layer 28 in the reverse sequence from that described in FIG. 2. That is, the design color layer 50 is preferably directly applied to the bottom side of the support layer 28 facing the core layer 10, then the first primer layer thereto, and the color coatings 30, 36 thereto. A further second primer layer 48 can be optionally applied, having similar composition to the first primer layer 40, but advantageously having a lesser thickness $h_8$. The second primer layer can be preferably applied again by means of screen printing. The finishing layer 90 then present is bonded to the core layer 10, for example by laminating.

The invention claimed is:

1. A method for producing a finishing layer containing a window for a portable data storage medium, comprising the steps:
    providing a transparent plastic-based support layer for covering a core layer comprising a window,
    applying to the support layer an opaque color layer by screen printing, wherein the color layer comprises a cutout having the dimensions of the window,
    applying to the opaque color layer a first transparent buffer layer by screen printing,
    applying a design color layer over the buffer layer by offset printing, and
    coating a transparent finish over the design color layer.

2. The method according to claim 1, including applying a second transparent mediatory layer over the design color layer by offset printing prior to applying the transparent finish.

3. The method according to claim 1, wherein the cutout precisely matches or is slightly smaller than a display area of an active display element.

4. The method according to claim 1, including applying a second color layer to the support layer in the same manner as the first layer, the second layer comprising a cutout matching the cutout of the first color layer.

5. The method according to claim 1, including using a water-based color for the color layer.

6. The method according to claim 1, including applying the color layers in a liquid state so that the color layers have a thickness of 10 to 30 µm in a dry state.

7. The method according to claim 1, including using a PET film as the support layer.

8. The method according to claim 4, including applying the second color layer to the bottom side of the support layer.

9. The method according to claim 1, including applying the design color layer to the support layer prior to applying the first buffer layer.

10. A use of the method recited in claim 1 for producing a portable data storage medium having a window in the top finishing layer, wherein the finishing layer recited in claim 1 is produced and said layer is bonded to a core layer comprising an active display element, with the result that the window comes to be located above the display area of the active display element.

11. A portable data storage medium comprising an active display element disposed in a core layer, and which display element is visible from a viewing side through a surface of the portable data storage medium, wherein a finishing layer is disposed over the core layer having the display element in a window of the core layer, the outer surface of said finishing layer facing away, and forming the surface of the portable data storage medium, and wherein the finishing layer comprises:
    a transparent support layer having a thickness between 50 and 100 µm covering the core layer,
    an opaque color layer applied to the transparent support layer, said opaque layer having a portion cut out above the display area of the active display element and having a height between 10 and 80% of the height of the support layer in a dry state,
    a primer layer applied to the opaque color layer, said primer layer having a height which is between 10% and 40% of the height of the support layer in the dry state,
    a design color layer over the primer layer,
    and a finish layer coated over the design color layer, said finish layer having a top surface forming a surface of the portable data storage medium.

12. The data storage medium according to claim 11, wherein the color layer is made of at least two identical color layers.

* * * * *

UNITED STATES PATENT AND TRADEMARK OFFICE
CERTIFICATE OF CORRECTION

PATENT NO. : 8,708,222 B2  
APPLICATION NO. : 13/201483  
DATED : April 29, 2014  
INVENTOR(S) : Huber Page 1 of 1

It is certified that error appears in the above-identified patent and that said Letters Patent is hereby corrected as shown below:

Title Page
Item (73), Assignee, change "Giesecke & Devirent GmbH" to --Giesecke & Devrient GmbH--

Signed and Sealed this
Ninth Day of September, 2014

Michelle K. Lee
*Deputy Director of the United States Patent and Trademark Office*